United States Patent
Luo

(10) Patent No.: US 10,379,687 B2
(45) Date of Patent: Aug. 13, 2019

(54) MANUFACTURE METHOD FOR A PROJECTION CAPACITIVE TOUCH SCREEN

(71) Applicant: Suzhou Touch Planet Co., Ltd., Suzhou, Jiangsu (CN)

(72) Inventor: Yanting Luo, Jiangsu (CN)

(73) Assignee: Suzhou Touch Planet Co., Ltd., Suzhou (CN)

(*) Notice: Subject to any disclaimer, the term of this patent is extended or adjusted under 35 U.S.C. 154(b) by 50 days.

(21) Appl. No.: 15/566,431

(22) PCT Filed: Mar. 9, 2016

(86) PCT No.: PCT/CN2016/076019
§ 371 (c)(1),
(2) Date: Oct. 13, 2017

(87) PCT Pub. No.: WO2017/124618
PCT Pub. Date: Jul. 27, 2017

(65) Prior Publication Data
US 2018/0101257 A1    Apr. 12, 2018

(30) Foreign Application Priority Data
Jan. 22, 2016    (CN) .......................... 2016 1 0040645

(51) Int. Cl.
*G06F 3/044*    (2006.01)
*G06F 3/0354*    (2013.01)

(52) U.S. Cl.
CPC .......... *G06F 3/044* (2013.01); *G06F 3/03547* (2013.01); *G06F 2203/04103* (2013.01)

(58) Field of Classification Search
CPC ............................ G06F 3/044; G06F 3/03547
USPC ................... 345/173, 174; 427/79; 428/221
See application file for complete search history.

(56) References Cited

U.S. PATENT DOCUMENTS

| | | | | |
|---|---|---|---|---|
| 2012/0105370 | A1* | 5/2012 | Moore | G06F 3/0412 345/174 |
| 2014/0295063 | A1* | 10/2014 | Petcavich | B41F 5/24 427/79 |
| 2014/0307344 | A1* | 10/2014 | Cammenga | B60R 1/088 359/872 |
| 2015/0261380 | A1* | 9/2015 | Powers | G06F 3/0416 345/173 |
| 2016/0121546 | A1* | 5/2016 | Yao | B33Y 10/00 428/221 |
| 2017/0066873 | A1* | 3/2017 | Gardet | C08G 63/199 |
| 2018/0032169 | A1* | 2/2018 | Kwak | G06F 3/044 |
| 2018/0154627 | A1* | 6/2018 | Yao | B33Y 10/00 |
| 2018/0298142 | A1* | 10/2018 | Gardet | C08G 63/199 |

* cited by examiner

Primary Examiner — Prabodh M Dharia

(57) ABSTRACT

A manufacture method for a projection capacitive touch screen, includes following steps: (1) placing a clean PET substrate on a 3D printing platform, (2) the 3D printing platform outputting movement of x, y and z directions through control software, (3) aligning tail-throwing leads on the PET-X film, (4) tearing off the protective release film on one side of the PET-Y film, (5) bonding the PET-Y film and the PET-X film, (6) cutting off the redundant areas around the PET-XY film completed in the step (5), (7) drying the PET-XY film, and (8) laser welding the dried PET-XY film to obtain a projection capacitive touch screen.

10 Claims, 1 Drawing Sheet

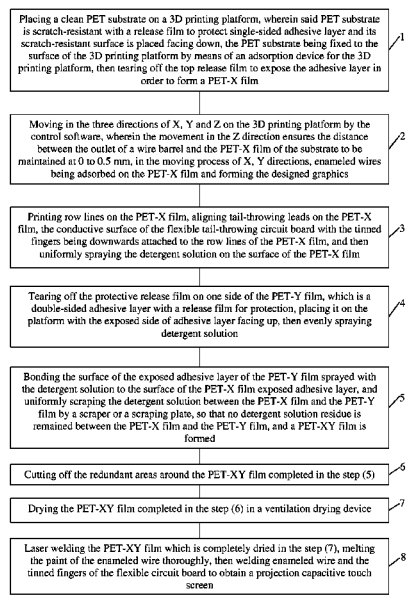

```
┌─────────────────────────────────────────────────────────────────────┐
│  Placing a clean PET substrate on a 3D printing platform, wherein   │
│  said PET substrate is scratch-resistant with a release film to     │
│  protect single-sided adhesive layer and its scratch-resistant      │──1
│  surface is placed facing down, the PET substrate being fixed to    │
│  the surface of the 3D printing platform by means of an adsorption  │
│  device for the 3D printing platform, then tearing off the top      │
│  release film to expose the adhesive layer in order to form a       │
│  PET-X film                                                          │
└─────────────────────────────────────────────────────────────────────┘
                                    │
┌─────────────────────────────────────────────────────────────────────┐
│  Moving in the three directions of X, Y and Z on the 3D printing    │
│  platform by the control software, wherein the movement in the Z    │
│  direction ensures the distance between the outlet of a wire barrel │──2
│  and the PET-X film of the substrate to be maintained at 0 to 0.5   │
│  mm, in the moving process of X, Y directions, enameled wires being │
│  adsorbed on the PET-X film and forming the designed graphics       │
└─────────────────────────────────────────────────────────────────────┘
                                    │
┌─────────────────────────────────────────────────────────────────────┐
│  Printing row lines on the PET-X film, aligning tail-throwing leads │
│  on the PET-X film, the conductive surface of the flexible tail-    │
│  throwing circuit board with the tinned fingers being downwards     │──3
│  attached to the row lines of the PET-X film, and then uniformly    │
│  spraying the detergent solution on the surface of the PET-X film   │
└─────────────────────────────────────────────────────────────────────┘
                                    │
┌─────────────────────────────────────────────────────────────────────┐
│  Tearing off the protective release film on one side of the PET-Y   │
│  film, which is a double-sided adhesive layer with a release film   │
│  for protection, placing it on the platform with the exposed side   │──4
│  of adhesive layer facing up, then evenly spraying detergent        │
│  solution                                                            │
└─────────────────────────────────────────────────────────────────────┘
                                    │
┌─────────────────────────────────────────────────────────────────────┐
│  Bonding the surface of the exposed adhesive layer of the PET-Y     │
│  film sprayed with the detergent solution to the surface of the     │
│  PET-X film exposed adhesive layer, and uniformly scraping the      │
│  detergent solution between the PET-X film and the PET-Y film by    │──5
│  a scraper or a scraping plate, so that no detergent solution       │
│  residue is remained between the PET-X film and the PET-Y film,     │
│  and a PET-XY film is formed                                        │
└─────────────────────────────────────────────────────────────────────┘
                                    │
┌─────────────────────────────────────────────────────────────────────┐
│  Cutting off the redundant areas around the PET-XY film completed   │──6
│  in the step (5)                                                    │
└─────────────────────────────────────────────────────────────────────┘
                                    │
┌─────────────────────────────────────────────────────────────────────┐
│  Drying the PET-XY film completed in the step (6) in a ventilation  │──7
│  drying device                                                      │
└─────────────────────────────────────────────────────────────────────┘
                                    │
┌─────────────────────────────────────────────────────────────────────┐
│  Laser welding the PET-XY film which is completely dried in the     │
│  step (7), melting the paint of the enameled wire thoroughly, then  │──8
│  welding enameled wire and the tinned fingers of the flexible       │
│  circuit board to obtain a projection capacitive touch screen       │
└─────────────────────────────────────────────────────────────────────┘
```

MANUFACTURE METHOD FOR A PROJECTION CAPACITIVE TOUCH SCREEN

TECHNICAL FIELD

The present invention relates to application fields of 3D-printing and digital modeling, and more particularly, to a method of manufacturing a projection capacitive touch screen.

BACKGROUND ART

Projection capacitive touch screen is a sensor film sealing the conductive fine-wires, which has advantages of precise sensing positioning, flexibility and high transparency. It could be used for precise touch positioning of 12-inch touch screens, as well as precise interactive projection.

Projected capacitive technology is a touch control technology of manufacturing horizontal and vertical electrode matrixes on a glass or transparent film surface and detecting finger touch through the capacitance changes of those electrodes. This technique involves two types according to the different ways in that the capacitance is produced.

The first type is self-capacitance touch screen. Horizontal and longitudinal electrode arrays of transparent conductive material are arranged on the surface of glass or transparent film. Those horizontal and longitudinal electrodes form a capacitance with ground respectively, which is commonly referred to as the self-capacitance, that is, the electrode to ground capacitance. When the finger touches the capacitive touch screen, the capacitance of the finger will be superimposed on the screen capacitor, so that the screen capacity increases. In the touch detection, the self-capacitance touch screen is in turn detected in the horizontal and vertical electrode array respectively. According to the changes of the capacitance before and after touch, horizontal coordinates and longitudinal coordinates could be determined respectively, which then are combined into a plane touch coordinates. The scanning manner of the self-capacitance touch screen is corresponding to project the touch point to the X axis and Y axis direction, then calculate the coordinates in the X axis and Y axis, direction to, and finally combine them into the touch point coordinates.

The second type is mutual capacitance touch screen. Horizontal and longitudinal electrode arrays of transparent conductive material are arranged on the surface of glass or transparent film. It differs from the self-capacitance touch screen in that the capacitance would be formed in the intersection of two sets of electrodes, that is, the two sets of electrodes constitute the two poles of capacitance respectively. When the finger touches the capacitive touch screen, it affects the coupling between the two electrodes near the touch point, thereby changing the capacitance between the two electrodes. When the mutual capacitance is detected, the horizontal electrodes sequentially emit excitation signals, and all the electrodes in the longitudinal direction receive signals at the same time, so that the capacitance value of the intersection of all the horizontal and vertical electrodes can be obtained, that is, the capacitance of the two-dimensional plane of the whole touch screen. According to the touch screen two-dimensional capacitance change data, the coordinates of each touch point could be calculated. Therefore, even if there are multiple touch points on the screen, the real coordinates of each touch point can be calculated.

The current large-size touch screen (12-inch or more) market is mainly occupied by the infrared screen. Infrared screen works by utilizing the infrared rays emitted around it. As long as there is an object to cut off the infrared, the screen will be able to respond. Capacitive touch screen is technically superior to the infrared screen in viewing of the following aspects:

1. Infrared screen will have action as long as anything blocks infrared, which would easily lead to false operation. For example, in winter if some objects such as clothes touch the infrared screen, it would produce a false operation.
2. Infrared screen is not easy to waterproof.
3. Infrared screen in the light irradiation is prone to drift or even has no action; therefore infrared screen is not suitable for outdoor use.
4. Capacitive touch screen has higher resolution, so the accuracy of products is much higher.

At present, there are two main methods for producing large-sized capacitive touch film.

One production method is the use of conductive oil film jet heating sintered into conductive electrodes. However, in the actual production, conductive oil film is difficult to control the diameter of the printed line, and it is easy to splash to the non-printing area to form impurity points. Print speed is relatively slow.

The other one is producing conductive electrodes by the use of 3D printing and heating sintering. However, in the actual production, printing speed is relatively slow, and the process is more complex and has low yield rate.

Therefore, the current large-size capacitive touch film problems lie in complex production process, slow production, low yield and high cost.

SUMMARY OF THE INVENTION

The technical problem primarily solved by the present invention is to provide a manufacture method for a projection capacitive touch screen, which is mainly for large-size capacitive touch film and first applies the 3D printing technology to the manufacturing method of the capacitive touch screen.

To solve the above technical problem, the present invention provides a manufacture method for a projection capacitive touch screen.

1. A manufacture method for a projection capacitive touch screen is characterized by comprising following steps:

(1) placing a clean PET substrate on a 3D printing platform, wherein said PET substrate is scratch-resistant with a release film to protect single-sided adhesive layer and its scratch-resistant surface is placed facing down, the PET substrate being fixed to the surface of the 3D printing platform by means of an adsorption device for the 3D printing platform, then tearing off the top release film to expose the adhesive layer in order to form a PET-X film;

(2) moving in the three directions of X, Y and Z on the 3D printing platform by the control software, wherein the movement in the Z direction ensures the distance between the outlet of a wire barrel and the PET-X film of the substrate to be maintained at 0 to 0.5 mm, in the moving process of X, Y directions, enameled wires being adsorbed on the PET-X film and forming the designed graphics;

(3) printing row lines on the PET-X film, aligning tail-throwing leads on the PET-X film, the conductive surface of the flexible tail-throwing circuit board with the tinned fingers being downwards attached to the row lines of the PET-X film, and then uniformly spraying the detergent solution on the surface of the PET-X film;

(4) tearing off the protective release film on one side of the PET-Y film, which is a double-sided adhesive layer with a release film for protection, placing it on the platform with the exposed side of adhesive layer facing up, then evenly spraying detergent solution;

(5) bonding the surface of the exposed adhesive layer of the PET-Y film sprayed with the detergent solution to the surface of the PET-X film exposed adhesive layer, and uniformly scraping the detergent solution between the PET-X film and the PET-Y film by a scraper or a scraping plate, so that no detergent solution residue is remained between the PET-X film and the PET-Y film, and a PET-XY film is formed;

(6) cutting off the redundant areas around the PET-XY film completed in the step (5);

(7) drying the PET-XY film completed in step (6) in a ventilation drying device; and (8) laser welding the PET-XY film which is completely dried in the step (7), melting the paint of the enameled wire thoroughly, then welding enameled wire and the tinned fingers of the flexible circuit board to obtain a projection capacitive touch screen.

In a preferred embodiment of the present invention, the 3D printing platform has three movements degree-of-freedom in the X, Y and Z directions, and the design pattern is converted into movements of the 3D printing platform in the X, Y and Z directions through control software.

In a preferred embodiment of the present invention, the 3D printing platform has the function of adsorbing a PET substrate, and the adsorption is electrostatic adsorption or exhaust fan adsorption.

In a preferred embodiment of the present invention, the thickness of the adhesive layer of the PET substrate in the step (1) is 7-50 microns, and the viscosity of the adhesive layer is kept at 500 g-5000 g.

In a preferred embodiment of the present invention, when the conductive surface with the tinned fingers of flexible tail-throwing circuit board is downwards bonded to printed row lines on the PET-X film, the error between them in the X and Y directions should maintained within 0-0.2 mm.

In a preferred embodiment of the present invention, the thickness of the double-sided adhesive layer of the PET-Y film in the step (4) is 7 um-50 um, and the viscosity of the double-sided adhesive layer is kept at 500 g-5000 g.

In a preferred embodiment of the present invention, the solute in the detergent solution in the step (4) and the step (5) is a detergent containing no pigment, wherein the volume ratio of the solute to the water in the detergent solution is from 1:10 to 1:20.

In a preferred embodiment of the present invention, the cutting error of the step (6) is less than 0.1 mm.

In a preferred embodiment of the present invention, the drying temperature in the step (7) is controlled at 30 to 200 degrees Celsius, and the drying time is controlled at 1-24 hours.

In a preferred embodiment of the present invention, the enameled wire in the step (2) has the diameter of 0.1 μm to 10 μm, the bobbins of enameled wires are fixed in a wire barrel, the wire barrel is fixed on the Z axis of the 3D printing platform, the barrel can be in a cylinder or rectangular shape, the outlet end of enameled wire adopts ruby nozzle, the inner diameter of which is less than 0.3 mm.

The beneficial effects of the present invention is: the manufacturing method of projection capacitive touch screen in the present invention is mainly used for the large-size capacitive touch film, and the 3D printing technology is first applied to the manufacturing method of the capacitive touch screen. It has advantages of simple production process, fast production speed, high yield and low cost. It solves the problems existed in the production of the large-sized capacitive touch film, such as complicated production process, slow production speed and high cost.

BRIEF DESCRIPTION OF THE DRAWINGS

The sole FIGURE illustrates a manufacture method for a projection capacitive touch screen according to an embodiment of the present invention.

DETAILED DESCRIPTION OF THE PREFERRED EMBODIMENTS

The technical solution in the embodiments of the present invention will be described below in a clear and complete manner. Obviously, the described embodiments are only a part of the embodiments of the present invention, and not all embodiments. All other embodiments obtained by those skilled in the art without making creative work are within the scope of the present invention, based on given embodiments in the present invention.

Embodiments in the present invention include:

A manufacture method for a projection capacitive touch screen, as illustrated in the sole FIGURE, comprising following steps, which need to be done in a dust-free workshop:

(1) Placing a clean PET substrate on a 3D printing platform, wherein said PET substrate is scratch-resistant with a release film to protect single-sided adhesive layer and its scratch-resistant surface is placed facing down, the PET substrate being fixed to the surface of the 3D printing platform by means of an adsorption device for the 3D printing platform, then tearing off the top release film to expose the adhesive layer in order to form a PET-X film;

(2) Moving in the three directions of X, Y and Z on the 3D printing platform by the control software, wherein the movement in the Z direction ensures the distance between the outlet of a wire barrel and the PET-X film of the substrate to be maintained at 0 to 0.5 mm, in the moving process of X, Y directions, enameled wires being adsorbed on the PET-X film and forming the designed graphics;

Said PET is a polyethylene terephthalate, and the PET-X film refers to a PET substrate film in the X direction. When the PET substrate is adsorbed on the surface of the 3D printing platform, it is necessary to check whether the PET substrate and the surface of the printing platform have been well fitted to ensure that the maximum distance between the PET substrate and the printing platform surface is less than 0.5 mm. Furthermore, the tearing of the release film requires uniform force to prevent the PET-X film from creasing.

The pattern formed is the design of the graphics. According to the design of the graphics (CAD graphics), the present invention can be used to produce self-capacitive touch screen or mutual capacitive touch screen. The only difference between them lies in the specific CAD graphics but not the production process.

The repeated positioning error of the 3D printing platform in the moving of X, Y and Z directions should be less than 0.2 mm, to ensure that the enameled wires are evenly adsorbed on the PET-X film surface without any tilt.

Furthermore, the three directions of X, Y, and Z are for the purpose of facilitating and simplifying the description and are not intended or implied that the means or elements referred to must have a specific orientation or be constructed and operated in a particular orientation. Accordingly, it should not be construed as limiting the present invention.

(3) Printing row lines on the PET-X film, aligning tail-throwing leads on the PET-X film, the conductive surface of the flexible tail-throwing circuit board with the tinned fingers being downwards attached to the row lines of the PET-X film, and then uniformly spraying the detergent solution on the surface of the PET-X film;

The flexible circuit board is fitted with PET-X film with printed row lines, to ensure that the error in the X and Y direction should not exceed 0.2 mm. The PET-X film surface is ensured to be evenly distributed a layer of detergent solution, free of dead corner.

(4) Tearing off the protective release film on one side of the PET-Y film, which is a double-sided adhesive layer with a release film for protection, placing it on the platform with the exposed side of adhesive layer facing up, then evenly spraying detergent solution;

The tearing of the release film requires uniform force to prevent the PET-X film from creasing. The PET-Y film surface is ensured to be evenly distributed a layer of detergent solution, free of dead corner.

(5) bonding the surface of the exposed adhesive layer of the PET-Y film sprayed with the detergent solution to the surface of the PET-X film exposed adhesive layer, and uniformly scraping the detergent solution between the PET-X film and the PET-Y film by a scraper or a scraping plate, so that no detergent solution residue is remained between the PET-X film and the PET-Y film, and a PET-XY film is formed;

The scraping plate or the scraper need to be used in uniform force, and no nick can be left on the surfaces of the PET-X film and the PET-Y film.

In view of the insulation performance of the enameled wires, no insulation layer need to be coated between the wires in the X direction and the wires in the Y direction, which can be directly overlapped together, so that the production complexity is reduced and the rate of finished products is improved. At the same time, due to the use of enameled wire printing technology, its advantages of fast print speed, high pattern accuracy and fine pattern lines ensure the diameter of the wire to be controlled in the 0.1-10 microns.

(6) Cutting off the redundant areas around the PET-XY film completed in the step (5);

(7) Drying the PET-XY film completed in step (6) in a ventilation drying device;

(8) Laser welding the PET-XY film which is completely dried in the step (7), melting the paint of the enameled wire thoroughly, then welding enameled wire and the tinned fingers of the flexible circuit board to obtain a projection capacitive touch screen.

In addition, the 3D printing platform has three movements degree-of-freedom in the X, Y and Z directions, and the design pattern is converted into movements of the 3D printing platform in the X, Y and Z directions through control software.

In addition, the 3D printing platform has the function of adsorbing a PET substrate, and the adsorption is electrostatic adsorption or exhaust fan adsorption.

In addition, the thickness of the adhesive layer of the PET substrate in the step (1) is 7-50 microns, and the viscosity of the adhesive layer is kept at 500 g-5000 g.

In addition, when the conductive surface with the tinned fingers of flexible tail-throwing circuit board is fitted downwards with printed row lines on the PET-X film, the error between them in the X and Y directions should maintained within 0-0.2 mm.

In addition, the thickness of the double-sided adhesive layer of the PET-Y film in the step (4) is 7-50 microns, and the viscosity of the double-sided adhesive layer is kept at 500 g-5000 g.

In addition, the solute in the detergent solution in the step (4) and the step (5) is a detergent containing no pigment, wherein the volume ratio of the solute to the water in the detergent solution is 1:10-20.

In addition, the cutting error of the step (6) is less than 0.1 mm.

In addition, the drying temperature in the step (7) is controlled at 30 to 200 degrees Celsius, and the drying time is controlled at 1-24 hours.

In addition, the enameled wire in the step (2) has the diameter of 0.1 μm to 10 μm. The bobbins of enameled wires are fixed in a wire barrel, and the wire barrel is fixed on the Z axis of the 3D printing platform. The barrel can be in a cylinder or rectangular shape. The outlet end of enameled wire adopts ruby nozzle, the inner diameter of which is less than 0.3 mm to ensure the accuracy of the printed outlet position.

Compared with the prior art, the manufacturing method of projection capacitive touch screen in the present invention is mainly used for the large-size capacitive touch film, and the 3D printing technology is first applied to the manufacturing method of the capacitive touch screen. It has advantages of simple production process, fast production speed, high yield and low cost. The invention solves the problems existed in the production of the large-sized capacitive touch film, such as complicated production process, slow production speed and high cost. Furthermore, the projection capacitive touch screen produced by the present invention has the following advantages:

(1) Capacitive touch screen has higher resolution, so the accuracy of products is much higher.

(2) In view of the insulation performance of the enameled wires, no insulation layer need to be coated between the wires in the X direction and in the Y direction, which can be directly overlapped together, so that the production complexity is reduced and the rate of finished products is improved.

(3) Due to the use of enameled wire printing technology, its advantages of fast print speed, high pattern accuracy and fine pattern lines ensure the diameter of the wire to be controlled in the 0.1-10 microns.

(4) The capacitive touch screen has the advantages of high resolution, no misoperation and good waterproof performance.

Above descriptions are only embodiments of the present invention and are not intended to limit the scope of the present invention. Any equivalent structure or equivalent process transformation made by using contents of the present description, either directly or indirectly, used in other related technical fields, is equally encompassed within the protection scope of the invention.

The invention claimed is:

1. A manufacture method for a projection capacitive touch screen, comprising the following steps:
   (1) placing a clean PET substrate on a 3D printing platform, wherein said PET substrate is scratch-resistant with a release film to protect single-sided adhesive layer and its scratch-resistant surface is placed facing down, the PET substrate being fixed to the surface of the 3D printing platform by means of an adsorption device for the 3D printing platform, then tearing off the top release film to expose the adhesive layer in order to form a PET-X film;

(2) moving in the three directions of X, Y and Z on the 3D printing platform by the control software, wherein the movement in the Z direction ensures the distance between the outlet of a wire barrel and the PET-X film of the substrate to be maintained at 0 to 0.5 mm, in the moving process of X, Y directions, enameled wires being adsorbed on the PET-X film and forming the designed graphics;

(3) printing row lines on the PET-X film, aligning tail-throwing leads on the PET-X film, the conductive surface of the flexible tail-throwing circuit board with the tinned fingers being downwards attached to the row lines of the PET-X film, and then uniformly spraying the detergent solution on the surface of the PET-X film;

(4) tearing off the protective release film on one side of the PET-Y film, which is a double-sided adhesive layer with a release film for protection, placing it on the platform with the exposed side of adhesive layer facing up, then evenly spraying detergent solution;

(5) bonding the surface of the exposed adhesive layer of the PET-Y film sprayed with the detergent solution to the surface of the PET-X film exposed adhesive layer, and uniformly scraping the detergent solution between the PET-X film and the PET-Y film by a scraper or a scraping plate, so that no detergent solution residue is remained between the PET-X film and the PET-Y film, and a PET-XY film is formed;

(6) cutting off the redundant areas around the PET-XY film completed in the step (5);

(7) drying the PET-XY film completed in step (6) in a ventilation drying device; and (8) laser welding the PET-XY film which is completely dried in the step (7), melting the paint of the enameled wire thoroughly, then welding enameled wire and the tinned fingers of the flexible circuit board to obtain a projection capacitive touch screen.

2. The manufacture method for a projection capacitive touch screen according to claim 1, wherein the 3D printing platform has three movements degree-of-freedom in the X, Y and Z directions, and the design pattern is converted into movements of the 3D printing platform in the X, Y and Z directions through control software.

3. The manufacture method for a projection capacitive touch screen according to claim 1, wherein the 3D printing platform has the function of adsorbing a PET substrate, and the adsorption is electrostatic adsorption or exhaust fan adsorption.

4. The manufacture method for a projection capacitive touch screen according to claim 1, wherein the thickness of the adhesive layer of the PET substrate in the step (1) is 7-50 microns, and the viscosity of the adhesive layer is kept at 500 g-5000 g.

5. The manufacture method for a projection capacitive touch screen according to claim 1, wherein when the conductive surface with the tinned fingers of flexible tail-throwing circuit board is downwards bonded to printed row lines on the PET-X film, the error between them in the X and Y directions should maintained within 0-0.2 mm.

6. The manufacture method for a projection capacitive touch screen according to claim 1, wherein the thickness of the double-sided adhesive layer of the PET-Y film in the step (4) is 7-50 microns, and the viscosity of the double-sided adhesive layer is kept at 500 g-5000 g.

7. The manufacture method for a projection capacitive touch screen according to claim 1, wherein the solute in the detergent solution in the step (4) and the step (5) is a detergent containing no pigment, wherein the volume ratio of the solute to the water in the detergent solution is from 1:10 to 1:20.

8. The manufacture method for a projection capacitive touch screen according to claim 1, wherein the cutting error of the step (6) is less than 0.1 mm.

9. The manufacture method for a projection capacitive touch screen according to claim 1, wherein the drying temperature in the step (7) is controlled at 30 to 200 degrees Celsius, and the drying time is controlled at 1-24 hours.

10. The manufacture method for a projection capacitive touch screen according to claim 1, wherein the enameled wire in the step (2) has the diameter of 0.1 μm to 10 μm, the bobbins of enameled wires are fixed in a wire barrel, the wire barrel is fixed on the Z axis of the 3D printing platform, the barrel can be in a cylinder or rectangular shape, the outlet end of enameled wire adopts ruby nozzle, the inner diameter of which is less than 0.3 mm.

* * * * *